Patented Aug. 30, 1927.

1,640,899

UNITED STATES PATENT OFFICE.

WALTER KROPP, OF ELBERFELD, NEAR COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY.

PROCESS FOR THE MANUFACTURE OF CONDENSATION PRODUCTS OF CROTONALDEHYDE.

No Drawing. Application filed March 5, 1926, Serial No. 92,622, and in Germany May 14, 1925.

In German Patent No. 372,855 a process for the manufacture of artificial resins is described. The process consists in the condensation, with the addition of acid condensing agents, of aromatic bases, as for example, aniline, toluidine, xylidine, α-naphthylamine etc. with various aldehydes, as for example, with croton-aldehyde.

The present invention concerns the manufacture of technically valuable products by the condensation of crotonaldehyde with aromatic amines without the addition of a condensing agent, the reaction taking place in a remarkably smooth and simple manner. The omission of the condensing agent offers the advantage of a simpler method of working and also of course obviates the removal from the reaction product of the acid condensing agent, which in some instances of application of the process often causes difficulty. The condensation itself may take place in the presence or absence of a suitable solvent or diluent.

The following examples will serve to illustrate my invention:—

*Example 1.*—To 56 parts by weight of crotonaldehyde 60 parts by weight of aniline are gradually added with brisk stirring. The temperature during this process should not be allowed to rise above 50° C. When all of the aniline has been added, the reaction mass is further stirred for 3 hours at this temperature, after which the whole is allowed to remain over night and is finally heated in a vacuum to 125° C. until the easily volatile constituents are completely removed. The residue consists of a brittle resin.

*Example 2.*—120 parts by weight of aniline are dissolved in 250 volumes of alcohol. To this solution a solution of 110 parts by weight of crotonaldehyde in 250 volumes of alcohol is slowly added, so that the temperature gradually rises to 60–70° C. Thereafter boiling is effected for from 2–3 hours, the alcohol is distilled off and the residue is heated in a vacuum to 135° C. The material thus remaining is brittle and can be easily pulverized.

*Example 3.*—65 parts by weight of aniline are dissolved in 150 volumes of benzene. To this 75 parts by weight of crotonaldehyde in 100 volumes of benzol are added, care being taken that the temperature does not rise above from 30–35° C. The whole is now allowed to remain for 30 hours and the benzene and other volatile constituents are evaporated in a vacuum at a temperature finally reaching about 120–130° C. Instead of benzene, acetone or other solvents may be employed.

*Example 4.*—To 56 parts by weight of crotonaldehyde 69 parts by weight of o-toluidine are slowly added with constant stirring, so that the temperature remains constant at about 40–50° C. After several hours stirring at this temperature the whole is heated in a vacuum at 130° C. The residue is quite easily pulverized.

I claim:—

1. A method of making a condensation product of crotonaldehyde which comprises condensing crotonaldehyde with an aromatic amine in the absence of a condensing agent.

2. A method of making a condensation product of crotonaldehyde which comprises condensing crotonaldehyde with an aromatic amine at a temperature below 70° C. and subsequently heating the resulting residue in a vacuum to a temperature of about from 120° to 135° C.

3. A method of making a condensation product of crotonaldehyde, as defined in claim 1, characterized by the fact that the steps are carried out in the absence of a diluent.

In testimony whereof I have hereunto set my hand.

WALTER KROPP.